(12) United States Patent
Yoo et al.

(10) Patent No.: US 10,648,448 B2
(45) Date of Patent: May 12, 2020

(54) TIDAL CURRENT GENERATOR

(71) Applicants: Wonki Yoo, Gyeongsangbuk-do (KR); Sarang Yoo, Daegu (KR); Hyunjung Yoo, Daegu (KR)

(72) Inventors: Wonki Yoo, Gyeongsangbuk-do (KR); Sarang Yoo, Daegu (KR); Hyunjung Yoo, Daegu (KR)

( * ) Notice: Subject to any disclaimer, the term of this patent is extended or adjusted under 35 U.S.C. 154(b) by 0 days.

(21) Appl. No.: 16/096,222

(22) PCT Filed: Jan. 17, 2017

(86) PCT No.: PCT/KR2017/000544
§ 371 (c)(1),
(2) Date: Oct. 24, 2018

(87) PCT Pub. No.: WO2017/204437
PCT Pub. Date: Nov. 30, 2017

(65) Prior Publication Data
US 2019/0136825 A1    May 9, 2019

(30) Foreign Application Priority Data

May 24, 2016    (KR) .................. 10-2016-0063456

(51) Int. Cl.
*F03B 13/26* (2006.01)
*H02K 7/18* (2006.01)
*H02J 7/14* (2006.01)

(52) U.S. Cl.
CPC .............. *F03B 13/264* (2013.01); *H02J 7/14* (2013.01); *H02K 7/18* (2013.01);
(Continued)

(58) Field of Classification Search
CPC .............. F03B 13/264; F05B 2220/706; F05B 2240/30; F05B 2240/40; F05B 2240/97; F05B 2260/50
See application file for complete search history.

(56) References Cited

U.S. PATENT DOCUMENTS

| | | | | |
|---|---|---|---|---|
| 1,847,855 A | * | 3/1932 | Young | F03B 13/264 415/5 |
| 3,993,913 A | * | 11/1976 | Dickman | E02B 9/08 290/53 |

(Continued)

FOREIGN PATENT DOCUMENTS

| | | | | |
|---|---|---|---|---|
| KR | 20060096779 | * | 9/2006 | F03B 13/12 |
| KR | 20110035310 | | 4/2011 | |

(Continued)

*Primary Examiner* — Tulsidas C Patel
*Assistant Examiner* — Joseph Ortega
(74) *Attorney, Agent, or Firm* — IPLA P.A.; James E. Bame

(57) ABSTRACT

A tidal current generator relates to a tidal current generator that can efficiently generate power by separating an on-water power generation unit and an in-water power collection unit, that allows for easy management of facilities on the water because the facilities in the water can be easily pulled up on the water even if they break, that can maximally use the flow of tides using a connection rope and a groove formed on a rotary propeller, and that can maximize efficiency by controlling the number of power connections between a rotary unit and an on-water power generator in accordance with the states of the flow of tides to prevent waste or deficit of power transmission.

4 Claims, 6 Drawing Sheets

(52) U.S. Cl.
CPC ..... *F05B 2220/706* (2013.01); *F05B 2240/30* (2013.01); *F05B 2240/40* (2013.01); *F05B 2240/915* (2013.01); *F05B 2240/95* (2013.01); *F05B 2240/97* (2013.01); *F05B 2260/50* (2013.01); *Y02E 10/28* (2013.01); *Y02E 10/38* (2013.01)

(56) References Cited

U.S. PATENT DOCUMENTS

| | | | | |
|---|---|---|---|---|
| 4,575,639 A * | 3/1986 | Rogow | ................ | F03D 9/007 290/55 |
| 4,684,817 A * | 8/1987 | Goldwater | ............ | F03D 3/067 290/55 |
| 4,930,985 A * | 6/1990 | Klute | ................ | F03D 5/02 415/5 |
| 6,327,994 B1 * | 12/2001 | Labrador | ............ | B01D 61/10 114/382 |
| 6,856,036 B2 * | 2/2005 | Belinsky | ............ | F03B 17/063 290/42 |
| 2002/0197148 A1 * | 12/2002 | Belinsky | ............ | F03B 17/063 415/2.1 |
| 2006/0127210 A1 * | 6/2006 | Buttler | ................ | F03B 17/061 415/7 |
| 2006/0232075 A1 * | 10/2006 | Fraenkel | ............ | F03B 17/061 290/54 |
| 2008/0315591 A1 * | 12/2008 | Hamann | ................ | F03B 13/08 290/54 |
| 2009/0145345 A1 * | 6/2009 | Newcomb | ............ | B63B 7/082 114/248 |
| 2009/0322091 A1 * | 12/2009 | Jack | ................ | F03B 13/264 290/53 |
| 2010/0078211 A1 * | 4/2010 | Kim | ................ | H05K 1/0245 174/262 |
| 2010/0207393 A1 * | 8/2010 | Roberts | ............ | F03B 13/10 290/54 |
| 2011/0020123 A1 * | 1/2011 | Anderson | ............ | F03D 3/068 416/98 |
| 2011/0248504 A1 * | 10/2011 | Yu | ............ | F03B 13/264 290/53 |
| 2012/0121379 A1 * | 5/2012 | Chio | ............ | F03D 3/005 415/4.2 |
| 2012/0134820 A1 * | 5/2012 | Vance | ............ | F01D 7/00 416/117 |
| 2012/0213641 A1 * | 8/2012 | Lin | ............ | F03G 7/00 416/227 R |
| 2012/0260443 A1 * | 10/2012 | Lindgren | ............ | A46B 13/02 15/77 |
| 2015/0091303 A1 * | 4/2015 | Lee | ............ | F03D 3/005 290/53 |
| 2016/0201639 A1 * | 7/2016 | Hong | ............ | F03B 13/00 290/54 |
| 2017/0138333 A1 * | 5/2017 | Toran | ............ | F03B 17/06 |
| 2018/0023541 A1 * | 1/2018 | Santos | ............ | F03B 17/06 60/502 |
| 2018/0106236 A1 * | 4/2018 | Lee | ............ | F03B 13/10 |
| 2019/0017490 A1 * | 1/2019 | Cho | ............ | F03B 13/262 |
| 2019/0063401 A1 * | 2/2019 | Ethirajulu | ............ | F03D 3/02 |
| 2019/0242358 A1 * | 8/2019 | Chen | ............ | F03B 17/065 |

FOREIGN PATENT DOCUMENTS

| | | | | |
|---|---|---|---|---|
| KR | 20110129126 | * | 12/2011 | ............ F03D 1/06 |
| KR | 20120126002 | * | 11/2012 | ............ F03B 11/00 |
| KR | 2013016782 | * | 2/2013 | ............ F03B 13/10 |
| KR | 20130016782 | | 2/2013 | |

* cited by examiner

TIDAL CURRENT GENERATOR

BACKGROUND

The present invention relates to a tidal current generator. In detail, the present invention relates to a tidal current generator that can efficiently generate power by separating an on-water power generation unit and an in-water power collection unit, that allows for easy management of facilities on the water because the facilities in the water can be easily pulled up on the water even if they break, that can maximally use the flow of tides using a connection rope and a groove formed on a rotary propeller, and that can maximize efficiency by controlling the number of power connections between a rotary unit and an on-water power generator in accordance with the states of the flow of tides to prevent waste or deficit of power transmission.

Power generation systems for generating electricity are being implemented in a wide variety of ways. In case of a thermal power generation, a fossil energy etc. is used to cause serious environmental pollutions. In case of a nuclear power generation, there are many risk factors such as a storage of nuclear waste etc. and a possibility of explosion thereof.

On the other hand, a wind power generation and a photovoltaic power generation, which are getting the spotlight as a renewable energy, are heavily influenced by weather. In case of the wind power, it cannot generate electricity from wind unless the wind blows. Also, it is difficult to forecast the occurrence of wind. In case of the sunlight, it cannot generate electricity from solar heat in the dark or the rain or at night.

In comparison, the tidal current power generation, which is a marine power generation, has a very short history and a predominant power generation model has not yet appeared. However, it is a very attractive clean energy technology in that it is predictable and can be operated 24 hours a day, except for a certain time.

Unlike the tidal power generation of generating electricity by using a head of water through tidal dams, in the tidal current power generation, water turbine generators are installed at the points where tidal currents are fast and the installed water turbine generators are driven by using natural tidal current to generate electricity.

Therefore, since only the water turbine generators required for power generation without the tidal dam are installed, it costs less. On the contrary, it is difficult to select the right place and the power generation thereof depends on the intensity of the natural flow of the tidal current. In terms of environment, the flow of seawater is free and has little impact on the marine environment, so it is considered to be more environment-friendly than the tidal power generation.

The tidal current power generation, like the wind power generation, uses the kinetic energy of a fluid to generate electricity by rotating the turbines, except that the flow of seawater is used instead of the wind. The tidal current power is more attractive than the onshore wind power because the density of seawater is about 840 times larger than that of air. Accordingly, the size of a turbine of the tidal current is generally much smaller than that of a wind turbine at the same capacity. Generally, the energy generated by the fluid flow increases exponentially with the flow rate, and therefore, a place having a large flow rate is absolutely advantageous for tidal current power.

Despite these advantages, in the conventional tidal current generator system, there has been a disadvantage in that it cannot be easily repaired when facilities such as a rotating propeller (blade) or a connecting bearing and so on located in the water are broken. This is because the facilities are constantly rotated by strong tides in the water, making it difficult for workers to approach them.

In addition, in the conventional rotary propeller structure, since a large amount of vortex is generated in the sectional area of the portion of generating the driving force and the flow of the tidal current cannot be properly received, there is a problem in that the efficiency thereof is lowered. Also, the flow of the tide current is continuously changed according to the situation and terrain thereof, and the power generation efficiency is not stable at that time. Accordingly, the overall productivity of the tidal generator is not good.

SUMMARY OF THE INVENTION

The present invention has been made in consideration of the problems described above and an object of the present invention is to provide a tidal current generator that can efficiently generate power by separating an on-water power generation unit and an in-water power collection unit and that allows for easy management of facilities on the water because the facilities in the water can be easily pulled up on the water even if they break.

Another object of the present invention is to provide a tidal current generator that can maximally use the flow of tides using a connection rope and a groove formed on a rotary propeller and that can maximize efficiency by controlling the number of power connections between a rotary unit and an on-water power generator in accordance with the states of the flow of tides to prevent waste or deficit of power transmission.

According to one aspect of the present invention so as to accomplish these objects, there is provided to a tidal current generator including: an on-water power generation unit that is installed on the seawater to generate power through power generators; and an in-water power unit that is disposed under the seawater to support the on-water power generation unit and transmit power to the power generators using the flow of tides as a power source, wherein the in-water power unit includes: one or more supports that support the bottom of the on-water power generation unit on the sea bottom; one or more rotary bars that are installed perpendicular to the surface of the seawater with the upper ends exposed to the on-water power generation unit to transmit torque to the power generators; propeller assemblies that each include multiple propellers spaced a predetermined angle apart from one another on sides of the rotary bars to be rotated by the flow of tides; a bottom support that maintains balance of the rotary bars by connecting sides of the lower ends of the rotary bars and sides of the supports; and lifters that are disposed at the joints between the supports and the bottom support so that the rotary bars can be moved up and down along the supports.

Here, multiple propeller assemblies can be coupled to each of the rotary bars, the propellers each have multiple grooves formed in the shape of gear teeth on a cut-off surface of a semi-cylinder of which the radius decreases as it goes to the rotary bar, and the propellers are coupled to the rotary bars such that the cut-off surfaces face the flow of tides.

Also, hooks are formed on a side of each of the propellers and the propellers of each of the propeller assemblies are connected by a connection rope through the hooks, multiple power generators of the on-water power generation unit can be connected to one rotary bar, and power can be disconnected between a specific power generator and the rotary bar by power disconnection members, if necessary. Further, the number of power generators that are connected to one rotary bar can be controlled in accordance with the state of flow of tides.

Moreover, the on-water power generation unit further includes a power accumulator to keep electricity generated by the power generators or transmit the electricity to the land.

According to the tidal current generator of the present invention as described above, there are effects in that it can efficiently generate power and a probability of failure thereof due to a seawater etc. is low by separating an on-water power generation unit and an in-water power collection unit and that allows for easy management of facilities on the water because the facilities in the water can be easily pulled up on the water even if they break, thereby improving a productivity thereof and lowering a maintenance cost.

Also, there are effects in that it can maximally use the flow of tides of changing in real time by using a connection rope and a groove formed on a rotary propeller and that can maximize efficiency by controlling the number of power connections between a rotary unit and an on-water power generator in accordance with the states of the flow of tides to prevent waste or deficit of power transmission, thereby utilizing the whole large tidal energy for power generation.

Further, it is easy to further provide facilities such as wind power generator or solar power generator on the on-water structure, it is also possible to supply the electricity stored in the power accumulator to vehicles on the land, and it is also possible to connect the tidal current generator of the present invention to anchored ships for self-power generation. Accordingly, the present invention can be applied to various purposes.

BRIEF DESCRIPTION OF DRAWINGS

The above and other objects, features and advantages of the present invention will be more apparent from the following detailed description taken in conjunction with the accompanying drawings, in which.

DETAILED DESCRIPTION OF THE INVENTION

Figure 1:
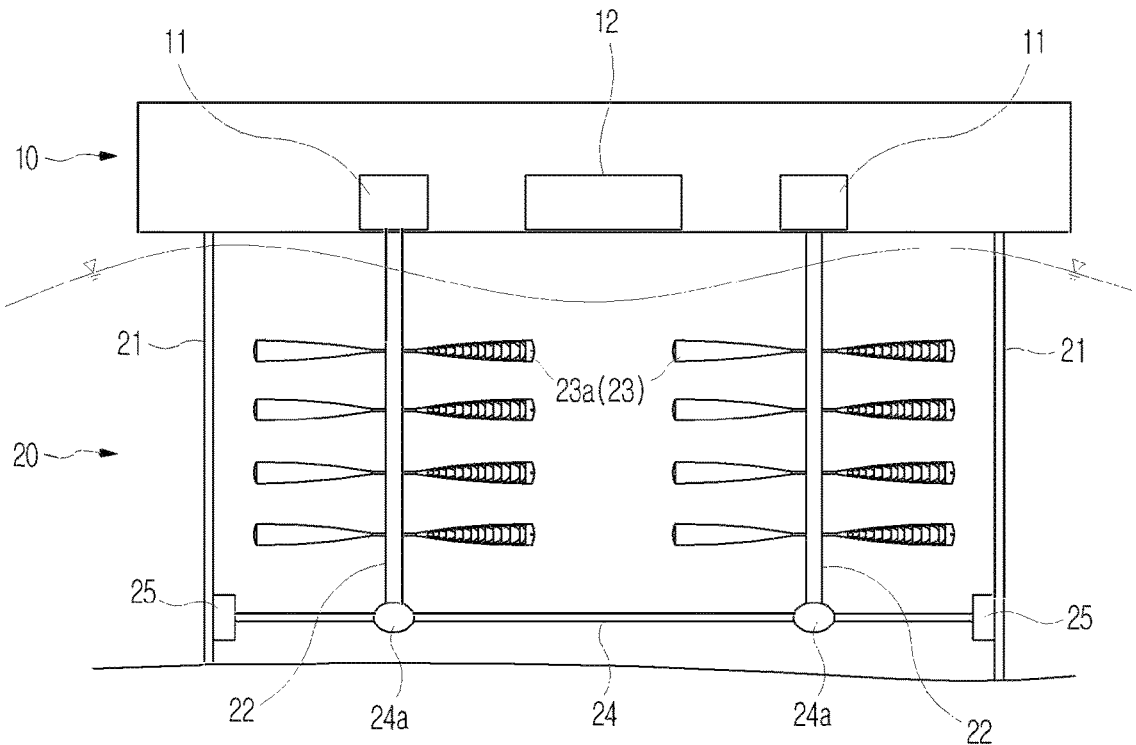
FIG. 1 is a view showing the configuration of a tidal current generator according to an embodiment of the present invention.

The present invention is described hereafter in detail with reference to the accompanying drawings. It should be understood that like components are given like reference numerals throughout the drawings. The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention. Therefore, the configurations described in the embodiments and drawings of the present invention are merely most preferable embodiments but do not represent all of the technical spirit of the present invention. Thus, the present invention should be construed as including all the changes, equivalents, and substitutions included in the spirit and scope of the present invention at the time of filing this application.

Figure 2:
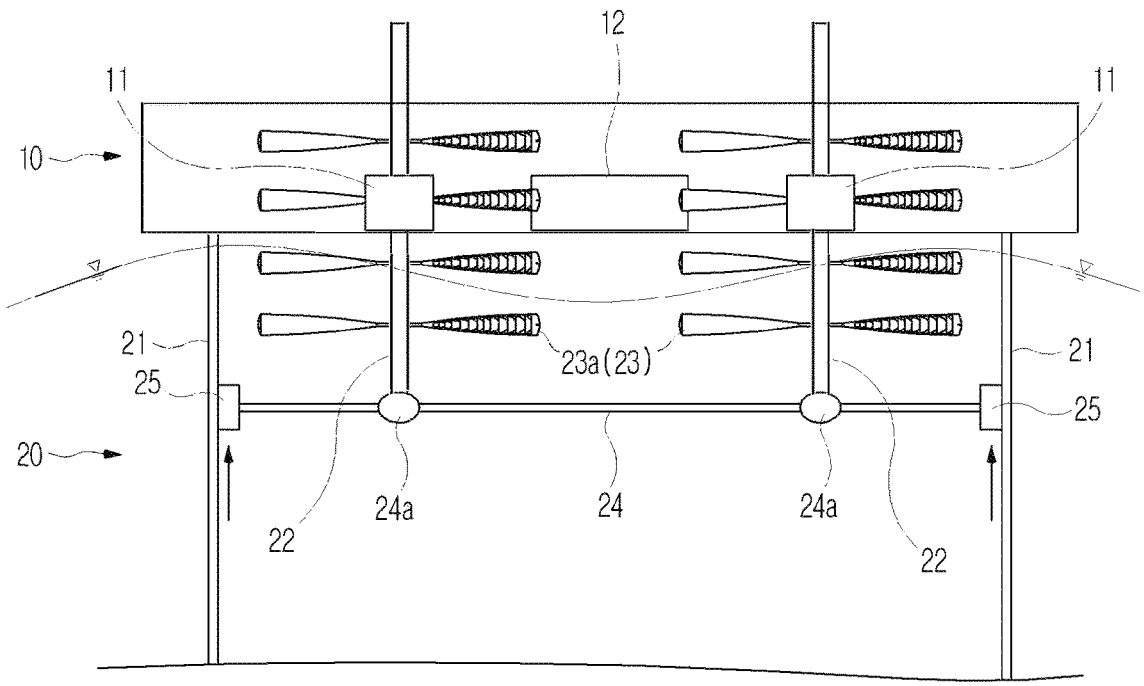
FIG. 2 is a view showing the tidal current generator according to an embodiment of the present invention with rotary bars lifted out of the seawater.

FIG. 1 is a view showing the configuration of a tidal current generator 11 according to an embodiment of the present invention and FIG. 2 is a view showing the tidal current generator 11 according to an embodiment of the present invention with rotary bars 22 lifted out of the seawater.

Referring to FIGS. 1 and 2, the tidal current generator 11 according to an embodiment of the present invention includes an on-water power generation unit 10 and an in-water power unit 20.

The on-water power generation unit 10, which generates power on the seawater using the power generator 11, has an on-water facility such as a barge. A power generator 11 that generates power and a power accumulator 12 that keeps electricity generated by the power generator 11 or transmits the electricity to the land can be disposed in the on-water power generation unit 10.

Since power is generated on the water, it is preferable to provide an appropriate unit that is not influenced by water and prevents corrosion from the lower end due to the seawater. The power accumulator 12 should be easily moved to be able to smoothly supply power to the land or apparatuses that require the power.

In the tidal current generator 11, multiple power generators 11 are provided for the capacity and productivity and the structure in which the power generators 11 generate power using connection to rotary bars 22 to be described below will be described in detail below.

The in-water power unit 20 supports the on-water power generation unit 10 under the seawater, transmits power to the power generator 11 using the flow of tides as a power source, and includes supports 21, rotary bars 22, propeller assemblies 23, a bottom support 24, and lifters 25.

The supports 21 support the bottom of the on-water power generation unit 10 on the sea bottom. The supports 21 firmly support the structure of the on-water power generation unit 10 like a barge on the sea bottom such that the structure is not damaged by water against fluctuation of the water and is not changed in position due to waves etc.

The rotary bars 22 are installed perpendicular to the surface of the seawater with the upper ends exposed to the on-water power generation unit 10 to transmit torque to the power generator 11. The rotary bars function as connection shafts that transmit torque, which is generated by the flow of tides in the water, to the surface of the water, so they should have high durability and high strength and anti-corrosion to prevent corrosion due to contact with the seawater.

The rotary bars 22 may be provided in an integrated type or a separable type and this structure is required because the lengths of the rotary bars 22 can be changed in accordance with the geography of the place where the tidal current generator 11 according to the present invention is installed.

The propeller assemblies 23 each include multiple propellers 23a spaced a predetermined angle apart from one another on sides of the rotary bars 22 to be rotated by the flow of tides. Since the propellers 23a are rotated by the flow of tides in the water, they may be formed in long bar shapes that use leverage to maximize the force. The detailed configuration of the propeller assemblies 23 is described below.

The bottom support 24 maintains balance of the rotary bars 22 by connecting sides of the lower ends of the rotary bars 22 and sides of the supports 21. The rotary bars 22 to which large propellers 23a may be connected, depending on the geography, may be changed in position when the flow of tides becomes strong. When the positions of the rotary bars 22 are changed, the function of the propellers 23a connected to the rotary bars 22 is correspondingly decreased, so they have to be firmly fixed. Accordingly, the bottom support 24 connects the lower ends of each rotary bar 22 to the supports 21, whereby it is possible to strongly maintain the center of rotation.

It is preferable to connect the bottom support 24 and the rotary bars 22 using connectors such as a bearing 24a because the rotary bars 22 have to continuously rotate. Further, the lifters 25 may be disposed at the joints between the supports 21 and the bottom support 24 so that the rotary bars 22 can be moved up and down along the supports 21.

It was difficult in the related art to repair the propellers 23a and the bearings 24a, which are disposed under the water, of the tidal current generator 11 when they are damaged. Since facilities are continuously rotated under the water due to strong tides, workers cannot easily approach the facilities.

Accordingly, in the tidal current generator 11 according to an embodiment of the present invention, the rotary bars 22 connected to each other through the bottom support 24 are designed to be able to be lifted on the seawater by the lifters 25. Therefore, when a facility under the water is damaged, workers can easily repair it on the on-water power generation unit 10.

The lifters 25 can be formed in various types such as a hydraulic type and a gear type or using wires, ball screws or guide rails. Further, although the rotary bars 22 and the in-water facility are heavy, they are lifted in the water, so they can be pulled up using smaller force than on the land.

Figure 3A:
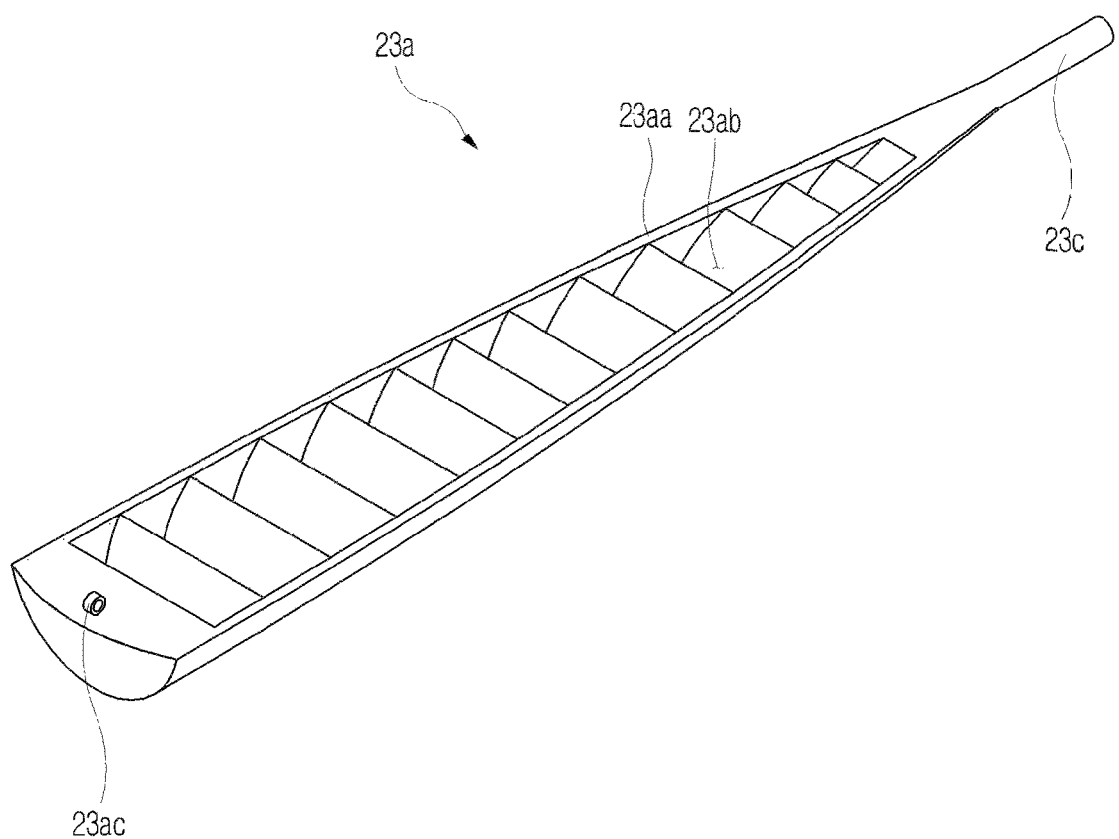
FIG. 3A is a perspective view showing a propeller of the tidal current generator according to an embodiment of the present invention.
Figure 3B:
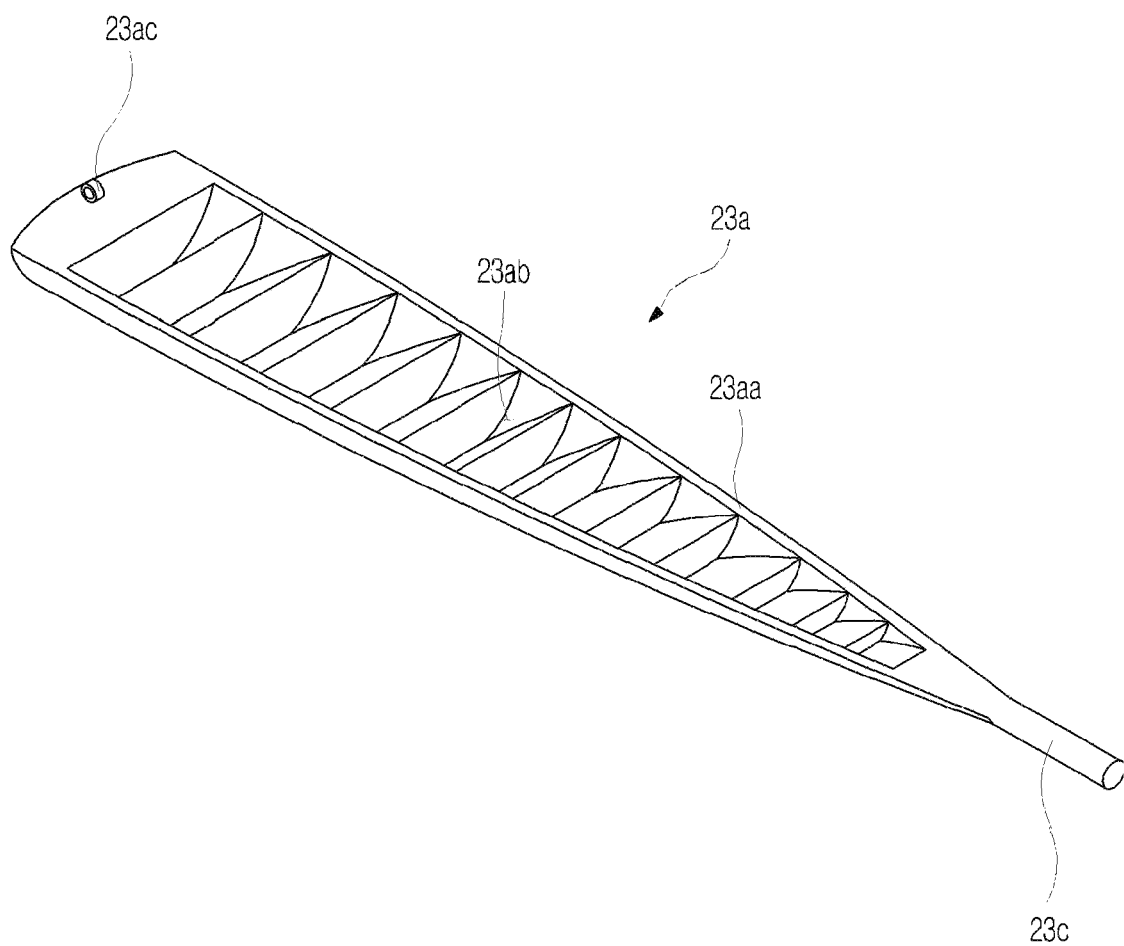
FIG. 3B is a perspective view showing the propeller of FIG. 3 in another direction.
Figure 4:
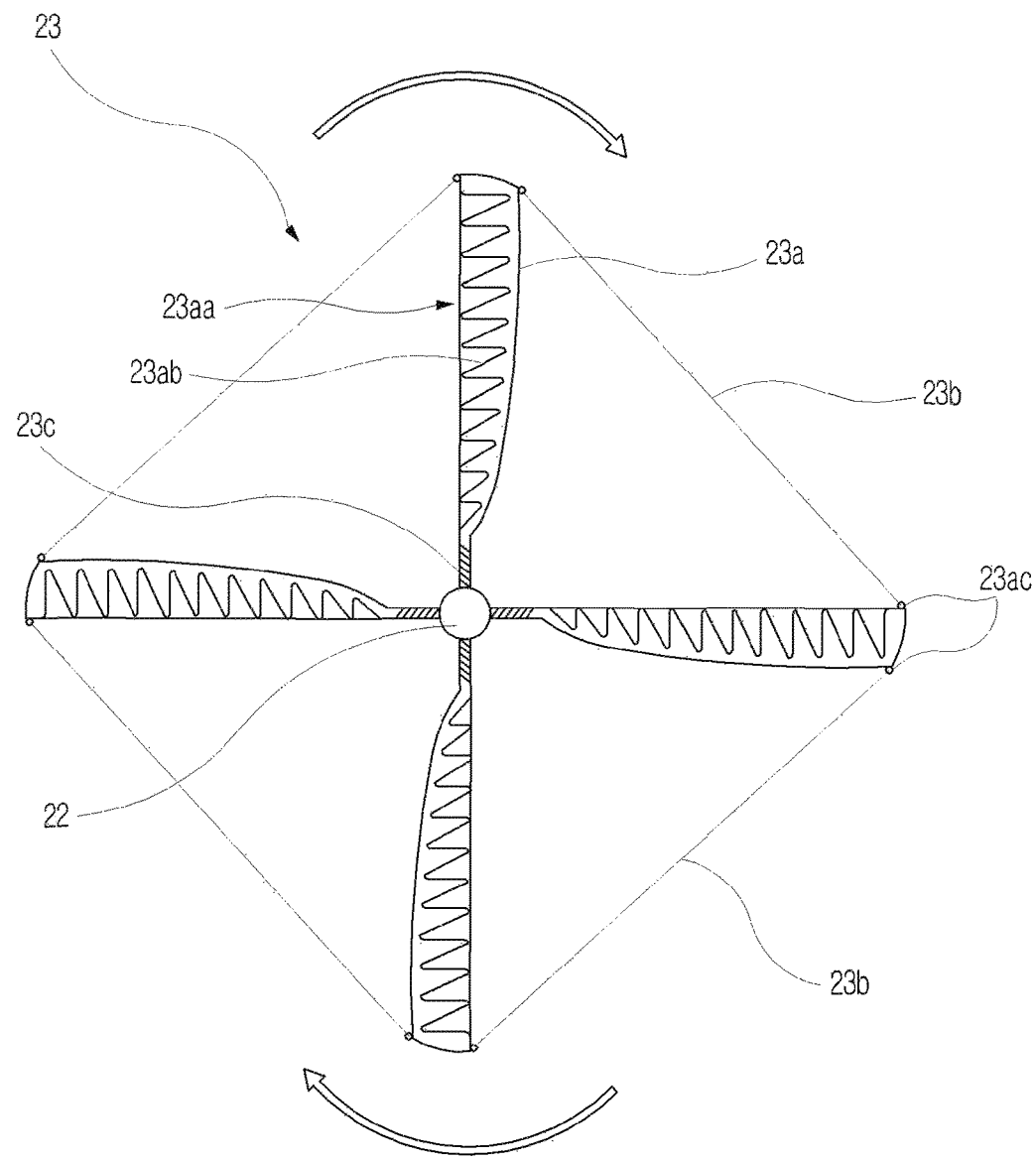
FIG. 4 is a perspective view showing a propeller assembly of the tidal current generator according to an embodiment of the present invention.

FIG. 3A is a perspective view showing a propeller 23a of the tidal current generator 11 according to an embodiment of the present invention, FIG. 3B is a perspective view showing the propeller 23a of FIG. 3 in another direction, and FIG. 4 is a perspective view showing a propeller assembly 23 of the tidal current generator 11 according to an embodiment of the present invention.

Referring to FIGS. 3 and 4, in the tidal current generator 11 according to an embodiment of the present invention, multiple propeller assemblies 23 may be arranged with vertical gaps on the rotary bars 22 and multiple propellers 23a are circumferentially arranged in each of the propeller assemblies 23. The number and length of the propellers 23a in each of the propellers 23 may depend on the environment where the tidal current generator 11 is installed.

For example, the lengths of the propellers 23a may be 10 m at a place with strong flow of tides, but 1 m may be enough at a place with weak flow of tides. If the propellers 23a are long, the term until the next propellers come when the propellers 23a are rotated is long. Accordingly, it is preferable to provide more propellers 23a by decreasing the gaps between the propellers 23a in order to compensate for this problem.

In order to maximize efficiency, the propellers 23a have to be formed such that a side has a large surface area to be able to receive maximum resistance by tides and the other side is formed substantially in a ridge shape to be able to minimize resistance by tides.

To this end, according to an embodiment of the present invention, the propellers 23a are fundamentally formed in a semi-cylindrical shape such that the radius decreases as it goes to necks 23c connected to the rotary bars 22, and multiple grooves 23ab may be formed inward in the shape of gear teeth on the cut-off side 23aa of the cylinder. Thereafter, the propellers are connected to the rotary bars 22 such that the cut-off surfaces 23aa face the flow of tides.

That is, the propellers 23a are formed in a streamline shape to maximize the force of the sides that maximally receive the mass energy of tides and push the propellers 23a and minimize the resistance by water on the other side so that the propellers 23a can be rotated forward by a pushing force. Further, surface areas are maximized to maximize resistance by tides by forming the grooves 23ab in the shape of gear teeth on the surface facing the flow of tides in the present invention. Further, water can be quickly discharged along the gaps between the teeth when the propellers 23a keep rotating after receiving resistance by tides.

Accordingly, it is possible to generate more torque from the flow of tides as compared with when the propellers 23a are formed in a common blade shape. Further, hooks 23ac are further formed at a side of each of the propellers 23a to prevent problem with rotation of the propellers 23a due to large resistance of tides. Further, the hooks 23ac of adjacent propellers 23a are connected by a connection rope 23b. Accordingly, more uniform torque can be induced.

Since the propellers 23a are connected by the connection ropes 23b, possible separation of the propellers 23a can be prevented. Further, a propeller 23a that receives torque now pulls the next propeller 23a, so the entire propeller assembly 23 can be rotated with a uniform pulse and it is possible to overcome resistance from tides due to rotation.

As described above, according to the tidal current generator 11 of the present invention, it is possible to maximally use the force of tides without being influenced by the flow of tides that changes in real time, using the connection ropes 23b and the grooves formed on the propellers 23a.

Figure 5A:
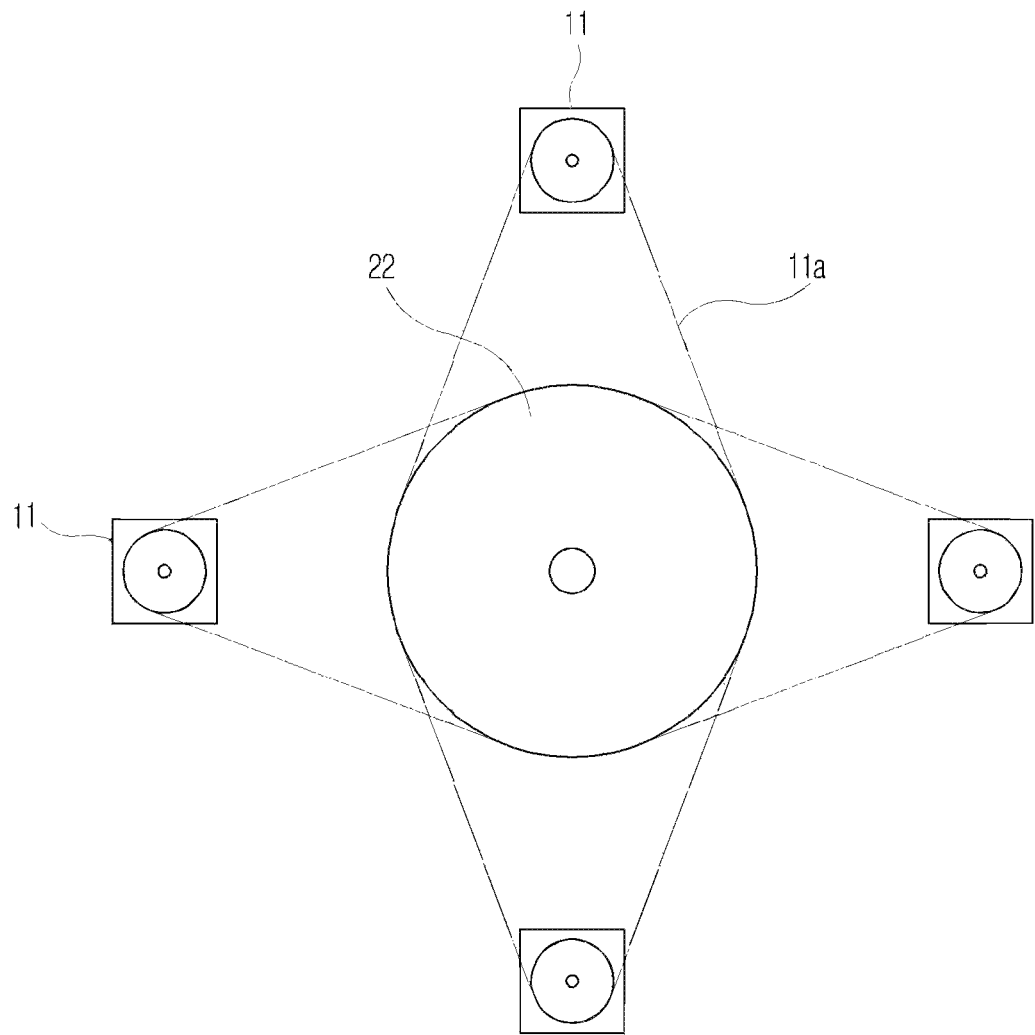
FIG. 5A is a view showing the case in which multiple power generators is connected to one rotary bar to transmit power in the tidal current generator according to an embodiment of the present invention.
Figure 5B:
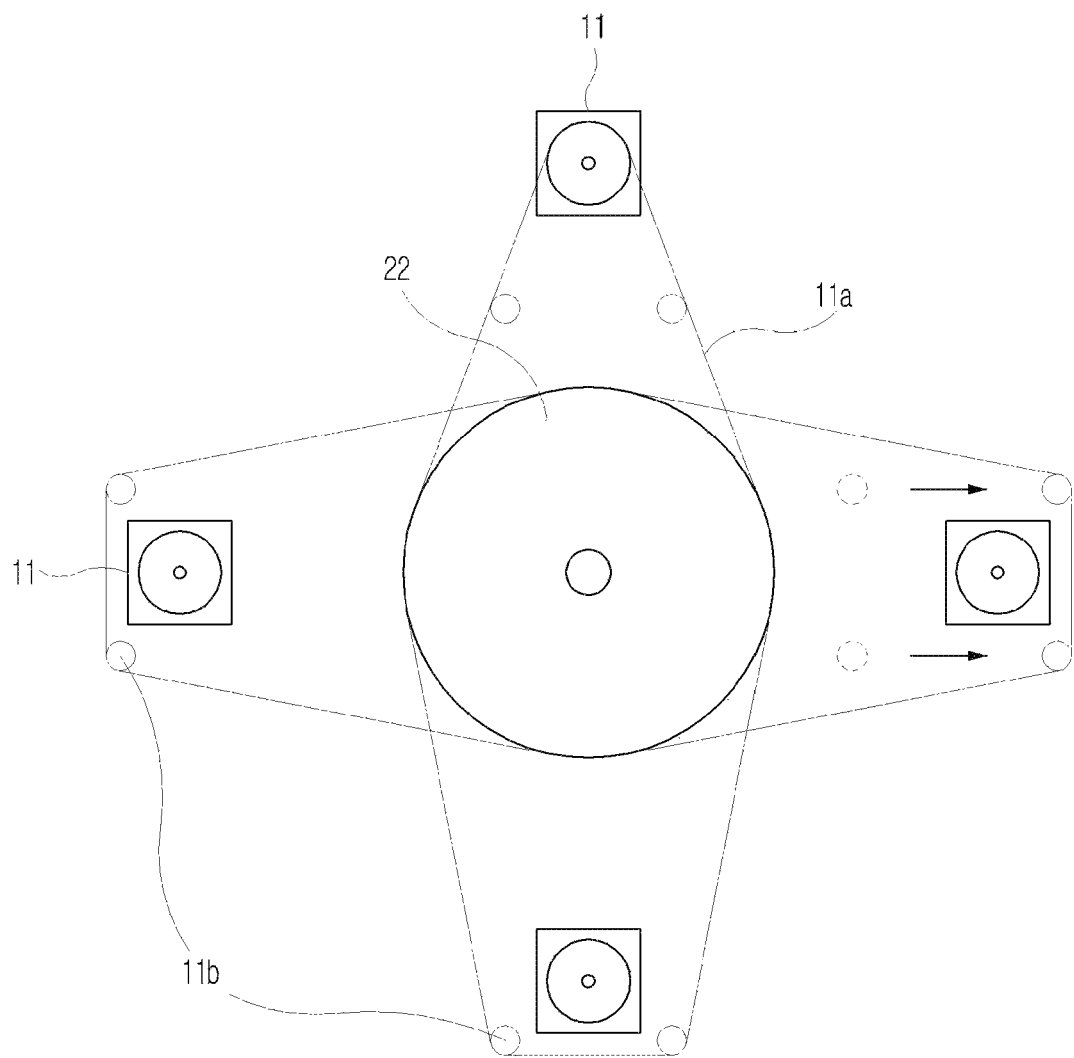
FIG. 5B is a view showing the case in which only one power generator is connected to one rotary bar to transmit power when the flow of tides is weak, in tidal current generator according to an embodiment of the present invention.

FIG. 5A is a view showing the case in which multiple power generators 11 is connected to one rotary bar 22 to transmit power in the tidal current generator 11 according to an embodiment of the present invention and FIG. 5B is a view showing the case in which only one power generator 11 is connected to one rotary bar 22 to transmit power when the flow of tides is weak, in tidal current generator 11 according to an embodiment of the present invention.

Referring to FIG. 5, multiple power generators 11 may be connected to each rotary bar 22 to transmit power in the on-water power generation unit 10 of the tidal current generator 11 according to an embodiment of the present invention. Power can be transmitted in a gear type, but using belts 11a is the most preferable. Power disconnection members 11b are provided in the present invention, so it is possible to disconnect power between specific power generators 11 and the rotary bars 22.

That is, it is possible to control the number of power generators 11 that are connected to one rotary bar 22 to transmit power, depending on the state of flow of tides. Accordingly, as shown at the right side in FIG. 5B, when the power disconnection members 11b are moved toward the power generator 11, the belt 11a wound on the rotary shaft of the power generator 11 can be naturally separated.

When a typhoon comes or the flow of tides is very strong, it is possible to achieve maximum production efficiency without waste of power by connecting as many power generators 11 to each rotary bar 22. In contrast, when the flow of tides is quiet such as in the period of stand of tide, it is inefficient to connect many power generators 11, so it is preferable to disconnect unnecessary power generators 11 so that even only one power generator 11 can receive power well.

In the tidal current generator 11 according to the present invention, it is possible to maximize efficiency by controlling the number of power connections between the rotary units and the on-water power generators 11 in accordance with the state of the flow of tides in order to prevent waste or deficit of power transmission, so it can be expected to use the whole large tidal energy for power generation.

Further, it is easy to further provide facilities such as wind power generator or solar power generator on the on-water structure, it is also possible to supply the electricity stored in the power accumulator to vehicles on the land, and it is also possible to connect the tidal current generator of the present invention to anchored ships for self-power generation. Accordingly, the present invention can be applied to various purposes.

While the present invention has been described with respect to the specific embodiments, it will be apparent to those skilled in the art that various changes and modifications may be made without departing from the spirit and scope of the present invention as defined in the following claims.

The invention claimed is:

1. A tidal current generator comprising:
   an on-water power generation unit that is installed on the seawater to generate power through power generators; and
   an in-water power unit that is disposed under the seawater to support the on-water power generation unit and transmit power to the power generators using the flow of tides as a power source,
   wherein the in-water power unit includes:
   one or more supports that support the bottom of the on-water power generation unit on the sea bottom;
   one or more rotary bars that are installed perpendicular to the surface of the seawater with the upper ends exposed to the on-water power generation unit to transmit torque to the power generators;
   propeller assemblies that each include multiple propellers spaced a predetermined angle apart from one another on sides of the rotary bars to be rotated by the flow of tides;
   a bottom support that maintains balance of the rotary bars by connecting sides of the lower ends of the rotary bars and sides of the supports; and
   lifters that are disposed at the joints between the supports and the bottom support so that the rotary bars can be moved up and down along the supports,
   wherein multiple power generators of the on-water power generation unit can be connected to one rotary bar, and power can be disconnected between a specific power generator and the rotary bar by power disconnection members, if necessary.

2. The tidal current generator of claim 1, wherein multiple propeller assemblies can be coupled to each of the rotary bars,
   the propellers each have multiple grooves formed in the shape of gear teeth on a cut-off surface of a semi-cylinder of which the radius decreases as it goes to the rotary bar, and
   the propellers are coupled to the rotary bars such that the cut-off surfaces face the flow of tides.

3. The tidal current generator of claim 1, wherein hooks are formed on a side of each of the propellers and the propellers of each of the propeller assemblies are connected by a connection rope through the hooks.

4. The tidal current generator of claim 1, wherein the number of power generators that are connected to one rotary bar can be controlled in accordance with the state of flow of tides.

* * * * *